United States Patent
Kim et al.

(10) Patent No.: US 10,913,877 B2
(45) Date of Patent: Feb. 9, 2021

(54) CURABLE MIXTURES FOR FORMING A LUBRICIOUS SURFACE OF FLUORINATED LUBRICANTS AND ARTICLES MADE THEREFROM

(71) Applicant: Adaptive Surface Technologies, Inc., Cambridge, MA (US)

(72) Inventors: Philseok Kim, Waltham, MA (US); Grant William Tremelling, Marlborough, MA (US)

(73) Assignee: Adaptive Surface Technologies, Inc., Cambridge, MA (US)

( * ) Notice: Subject to any disclaimer, the term of this patent is extended or adjusted under 35 U.S.C. 154(b) by 131 days.

(21) Appl. No.: 16/152,388

(22) Filed: Oct. 4, 2018

(65) Prior Publication Data
US 2019/0100681 A1    Apr. 4, 2019

Related U.S. Application Data

(60) Provisional application No. 62/568,288, filed on Oct. 4, 2017.

(51) Int. Cl.
| | |
|---|---|
| B32B 3/10 | (2006.01) |
| C09J 7/20 | (2018.01) |
| C09D 5/00 | (2006.01) |
| C09D 7/63 | (2018.01) |
| C09D 127/12 | (2006.01) |
| C08F 290/06 | (2006.01) |
| C08K 5/02 | (2006.01) |
| C09D 7/40 | (2018.01) |

(52) U.S. Cl.
CPC ........... *C09J 7/201* (2018.01); *C08F 290/062* (2013.01); *C08K 5/02* (2013.01); *C09D 5/00* (2013.01); *C09D 7/63* (2018.01); *C09D 127/12* (2013.01); *C09D 7/40* (2018.01); *C09J 2427/006* (2013.01); *C09J 2475/003* (2013.01)

(58) Field of Classification Search
None
See application file for complete search history.

(56) References Cited

U.S. PATENT DOCUMENTS

| | | | | |
|---|---|---|---|---|
| 5,707,742 A | * | 1/1998 | Usuki ................... | G11B 5/725 428/422 |
| 2009/0155517 A1 | * | 6/2009 | Suzuki .................. | G11B 5/725 428/65.8 |

* cited by examiner

*Primary Examiner* — Christopher M Polley
(74) *Attorney, Agent, or Firm* — Innovators Legal

(57) ABSTRACT

Curable compositions are provided for forming highly lubricious and long-lasting surfaces with optical clarity useful, for example, in optical applications in harsh environmental conditions. In some aspects, the curable formulations include an end-group modified perfluoropolyether (PFPE), a fluorinated lubricant, and a compatibilizer. The mixtures are curable to form a solid having an exposed surface. In some aspects, the fluorinated lubricant is chemically and physically matched to the resin such that, when cured, at least a portion of the fluorinated lubricant spontaneously forms a lubricious surface on the exposed surface. In some aspects, the compatibilizer is present in an amount sufficient to make the curable mixture miscible and to make the solid optically transparent while still spontaneously forming the lubricious surface. The lubricious surface can also be self-replenishing such that, when the lubricant is removed from the exposed surface, additional lubricant migrates to the surface to replenish the lubricious overlayer.

19 Claims, 5 Drawing Sheets

CURABLE MIXTURES FOR FORMING A LUBRICIOUS SURFACE OF FLUORINATED LUBRICANTS AND ARTICLES MADE THEREFROM

CROSS-REFERENCE TO RELATED APPLICATIONS

This application claims priority to, and the benefit of, U.S. provisional application entitled "CURABLE MIXTURES FOR FORMING A LUBRICIOUS SURFACE OF FLUORINATED LUBRICANTS AND ARTICLES MADE THEREFROM" having Ser. No. 62/568,288, filed Oct. 4, 2017.

TECHNICAL FIELD

The present disclosure generally relates to compositions for coatings and surfaces, and in particular to curable compositions for coatings and surfaces that are slippery and/or non-stick.

BACKGROUND

Harsh environments can create demanding application scenarios for surface lubrication. For example, many silicone-based lubricants can fail in hydrocarbon rich environments. There remains a need for improved surfaces, formulations for forming surface, and methods of use thereof that overcome the aforementioned deficiencies.

SUMMARY

In various aspects, this disclosure is directed to coatings and surfaces, methods and compositions for making coatings on surfaces, coated surfaces and articles, and uses thereof. In some aspects, the surfaces are capable of supporting a stable liquid-infused porous surface, creating a slippery lubricating surface that can repel objects to be repelled from the surface. The surfaces can be essentially free of pinning points leading to improved performance, low contact angle hysteresis on the surface, and improved surface lifetime.

In some aspects, a curable mixture is provided having (i) an end-group modified perfluoropolyether (PFPE), (ii) a fluorinated lubricant; and (iii) a compatibilizer, wherein the mixture is curable to form a solid comprising an exposed surface; wherein at least a portion of the fluorinated lubricant spontaneously forms a lubricious surface on the exposed surface; and wherein the compatibilizer is present in an amount sufficient to make the curable mixture miscible and to make the solid optically transparent while still spontaneously forming the lubricious surface that is slippery, repellent, anti-fouling, easy-to-clean, and/or low friction.

In some aspects, the end-group modified perfluoropolyether has a formula of A-F-B where F is either a linear or a branched perfluoropolyether, and A and B are each independently selected from the group consisting of an alcohol, a neutral or ionic form of carboxylic acid, a neutral or ionic form of phosphoric acid or its ester, a neutral or ionic form of phosphonic acid or its ester, a primary amine, a second or tertiary amine, an epoxy, an isocyanate, an acrylate, a methacrylate, a silane, a thiol, an alkene (vinyl, allyl), an alkyne, an alkoxy, an ionic urethane, a sulfonic acid or its ester, and a nitrile group.

Suitable compatibilizers can include a mono-functional perfluoropolyether, a carboxylic acid-modified perfluoropolyether, a di-functional perfluoropolyether, a dihydroxyl-modified perfluoropolyether, a hydrofluoroether (HFE), a perfluoroalkyl alkyl ether, 2,3-dihydrodecafluoropentane, or a mixture thereof.

Suitable fluorinated lubricants can include a perfluoropolyether, a partially hydrogenated perfluorocarbon, perfluorobron, perfluorodecalin, perfluoromethyldecalin, perfluoroperhydrophenanthrene, a perfluoroalkyl amine, a fluorocarbon with one or more other halogen atoms, or a mixture thereof.

In some aspects, the curable mixture further includes a co-monomer, e.g. to modulate structural properties of the cured composition. In some aspects, the co-monomer has the structure according to the formula $(Rf)_n$—R—X where Rf is a perfluoroalkyl, n is an integer from 1 to 3, R is a non-fluorinated or partially fluorinated hydrocarbon, and X is a polymerizable end group.

Articles having a slippery surface formed from the curable mixtures are also provided. Suitable articles can include two-dimensional articles such as a film, a sheet, a tape, or a coating and three-dimensional articles such as a tubing, a container, a vessel, a tank, or a vat.

Other systems, methods, features, and advantages of the coatings, surfaces, methods, compositions, articles, and uses thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1A:
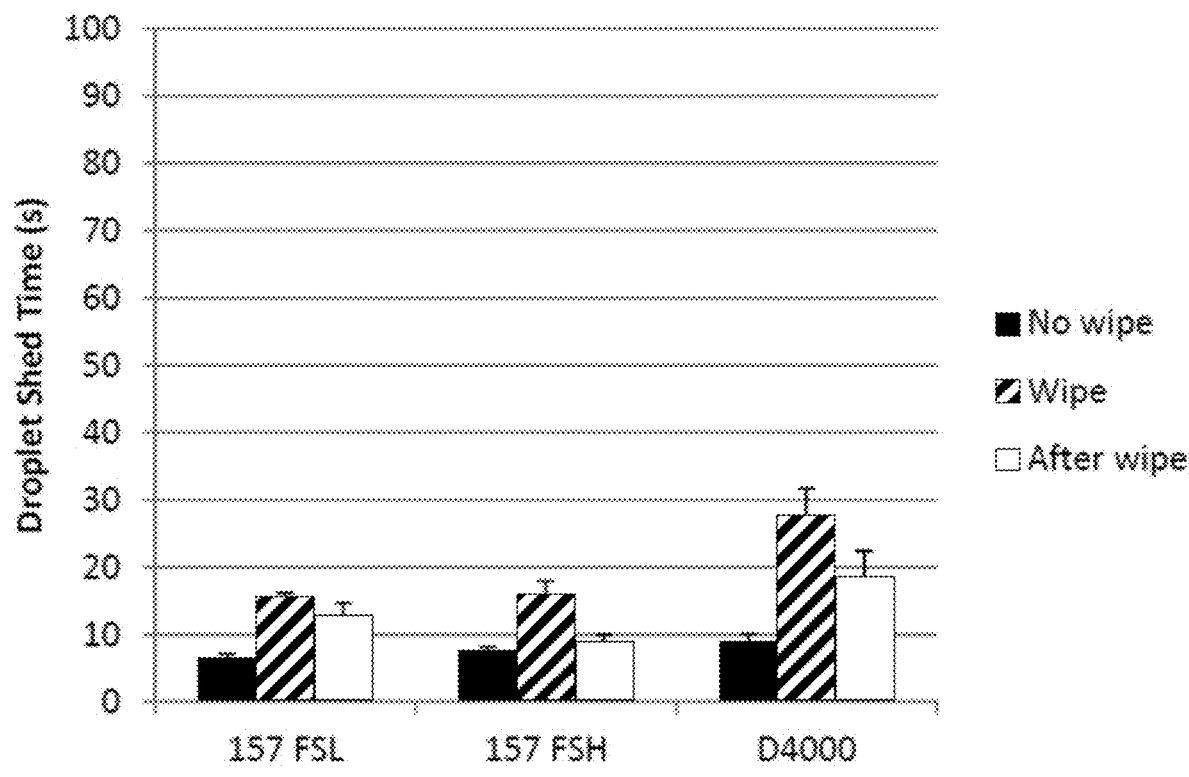
FIG. 1A is a bar graph of the droplet shed time (seconds) for dark cutting oil for an MD40:Krytox 100 (1:1) cured resin with minimum compatibilizer loading of 157 FSL (3.581 wt %), 157 FSH (4.657 wt %), or D4000 (8.532 wt %) shortly after curing (no wipe), following wiping the surface to remove the liquid overlayer (wipe), and after allowing the surface to rebloom following wiping (after wipe).

The current disclosure provides improved one pot curable formulations for forming a self-replenishing lubricious surface and surfaces formed therefrom based on the use of fluorinated lubricants. The formulations and surfaces provide certain advantages, for example in harsh environments or in optical applications.

In some aspects, the curable formulations include an end-group modified perfluoropolyether (PFPE), a fluorinated lubricant, and a compatibilizer. The mixtures are curable to form a solid having an exposed surface. In some aspects, the fluorinated lubricant is chemically and physically matched to the resin that, when cured, at least a portion of the fluorinated lubricant spontaneously forms a lubricious surface on the exposed surface that is slippery, repellent, anti-fouling, easy-to-clean, and/or low friction. The lubricious surface (lubricious overlayer) can also be self-replenishing such that, when the lubricant is removed from the exposed surface, additional lubricant migrates (reblooms) to the surface to replenish the lubricious overlayer.

In order to form a curable liquid mixture to use as a useful coating formulation, it is desirable for such a mixture to be a fully miscible and homogeneous mixture. Simple mixing of a functionalized PFPE (as a binder) with an inert fluorinated lubricant (e.g. Krytox PFPE) typically yield an immiscible, phase-separating mixture. The current disclosure demonstrates that a compatibilizer (e.g. fluorosurfactant) can be included to achieve a stable and homogeneous mixture that forms a uniform thin film as a coating when cured and that spontaneously forms and regenerates a lubricious surface after curing. In some aspects, the use of too much compatibilizer can compromise the slipperiness and the repellency of the coating. Therefore, the amount of the compatibilizer in the compositions must be optimized to yield a useful coating, e.g. a stable and homogeneous mixture that forms a uniform thin film as a coating when cured and that spontaneously forms and regenerates a lubricious surface after curing.

Before the present disclosure is described in greater detail, it is to be understood that this disclosure is not limited to particular embodiments described, and as such may, of course vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Throughout the application, where language such as having, including, or comprising is used to describe specific components or process steps, it is contemplated that other aspects exist that consist essentially of, or consist of the specific components or process steps.

The term "substantially free" as used in this context means the reaction product and/or coating compositions contain less than 1000 parts per million (ppm), "essentially free" means less than 100 ppm and "completely free" means less than 20 parts per billion (ppb) of any of the above compounds or derivatives or residues thereof. The term "about," as used herein, means approximately, in the region of, roughly, or around. When the term "about" is used with a numerical value, it modifies that value by extending the boundaries above and below the numerical value set forth. For example, in some aspects, the term "about" is used herein to modify a numerical value above and below the stated value by a variance of ±20%, ±15%, or ±10% of the stated value. In some aspects, the term "about" can reflect traditional uncertainties in experimental measurements and/or traditional rounding according to significant figures of the numerical value.

The term "alkyl" refers to the radical of saturated aliphatic groups, including straight-chain alkyl groups, branched-chain alkyl groups, cycloalkyl (alicyclic) groups, alkyl-substituted cycloalkyl groups, and cycloalkyl-substituted alkyl groups.

In some aspects, a straight chain or branched chain alkyl has 30 or fewer carbon atoms in its backbone (e.g., $C_1$-$C_{30}$ for straight chains, $C_3$-$C_{30}$ for branched chains), 20 or fewer, 12 or fewer, or 7 or fewer. Likewise, in some embodiments cycloalkyls have from 3-10 carbon atoms in their ring structure, e.g. have 5, 6 or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, or from one to six carbon atoms in its backbone structure. Likewise, "lower alkenyl" and "lower alkynyl" have similar chain lengths. Throughout the application, preferred alkyl groups are lower alkyls. In some embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In some embodiments, the "alkylthio" moiety is represented by one of —S-alkyl, —S-alkenyl, and —S-alkynyl. Representative alkylthio groups include methylthio, and ethylthio. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, and tert-butoxy. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O— alkynyl. Aroxy can be represented by —O-aryl or O-heteroaryl, wherein aryl and heteroaryl are as defined below. The alkoxy and aroxy groups can be substituted as described above for alkyl.

The terms "amine" and "amino" are art-recognized and refer to both unsubstituted and substituted amines, e.g., a moiety that can be represented by the general formula:

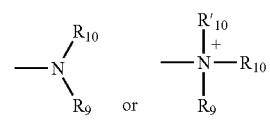

wherein $R_9$, $R_{10}$, and $R'_{10}$ each independently represent a hydrogen, an alkyl, an alkenyl, —$(CH_2)_m$—$R_8$ or $R_9$ and $R_{10}$ taken together with the N atom to which they are attached complete a heterocycle having from 4 to 8 atoms in the ring structure; $R_8$ represents an aryl, a cycloalkyl, a cycloalkenyl, a heterocycle or a polycycle; and m is zero or an integer in the range of 1 to 8. In some embodiments, only one of $R_9$ or $R_{10}$ can be a carbonyl, e.g., $R_9$, $R_{10}$ and the nitrogen together do not form an imide. In still other embodiments, the term "amine" does not encompass amides, e.g., wherein one of $R_9$ and $R_{10}$ represents a carbonyl. In additional embodiments, $R_9$ and $R_{10}$ (and optionally $R'_{10}$) each independently represent a hydrogen, an alkyl or cycloakyl, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of $R_9$ and $R_{10}$ is an alkyl group.

The term "amido" is art-recognized as an amino-substituted carbonyl and includes a moiety that can be represented by the general formula:

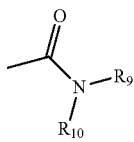

wherein $R_9$ and $R_{10}$ are as defined above.

"Aryl", as used herein, refers to $C_5$-$C_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN; and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. One or more of the rings can be substituted as defined above for "aryl".

The term "aralkyl", as used herein, refers to an alkyl group substituted with an aryl group (e.g., an aromatic or heteroaromatic group).

The term "carbocycle", as used herein, refers to an aromatic or non-aromatic ring in which each atom of the ring is carbon.

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —CF3, and —CN.

The term "carbonyl" is art-recognized and includes such moieties as can be represented by the general formula:

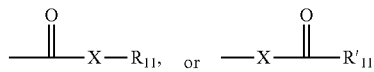

wherein X is a bond or represents an oxygen or a sulfur, and $R_{11}$ represents a hydrogen, an alkyl, a cycloalkyl, an alkenyl, an cycloalkenyl, or an alkynyl, $R'_{11}$ represents a hydrogen, an alkyl, a cycloalkyl, an alkenyl, an cycloalkenyl, or an alkynyl. Where X is an oxygen and $R_{11}$ or $R'_{11}$ is not hydrogen, the formula represents an "ester". Where X is an oxygen and $R_{11}$ is as defined above, the moiety is referred to herein as a carboxyl group, and particularly when $R_{11}$ is a hydrogen, the formula represents a "carboxylic acid". Where X is an oxygen and $R'_{11}$ is hydrogen, the formula represents a "formate". In general, where the oxygen atom of the above formula is replaced by sulfur, the formula represents a "thiocarbonyl" group. Where X is a sulfur and $R_{11}$ or $R'_{11}$ is not hydrogen, the formula represents a "thioester." Where X is a sulfur and $R_{11}$ is hydrogen, the formula represents a "thiocarboxylic acid." Where X is a sulfur and $R'_{11}$ is hydrogen, the formula represents a "thioformate." On the other hand, where X is a bond, and $R_{11}$ is not hydrogen, the above formula represents a "ketone" group. Where X is a bond, and $R_{11}$ is hydrogen, the above formula represents an "aldehyde" group.

The term "monoester" as used herein refers to an analogue of a dicarboxylic acid wherein one of the carboxylic acids is functionalized as an ester and the other carboxylic acid is a free carboxylic acid or salt of a carboxylic acid. Examples of monoesters include, but are not limited to, to monoesters of succinic acid, glutaric acid, adipic acid, suberic acid, sebacic acid, azelaic acid, oxalic and maleic acid.

The term "heteroatom" as used herein means an atom of any element other than carbon or hydrogen. Examples of heteroatoms are boron, nitrogen, oxygen, phosphorus, sulfur and selenium. Other heteroatoms include silicon and arsenic.

As used herein, the term "nitro" means —$NO_2$; the term "halogen" designates —F, —Cl, —Br or —I; the term "sulfhydryl" means —SH; the term "hydroxyl" means —OH; and the term "sulfonyl" means —$SO_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valencies of the heteroatoms.

In various embodiments, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some embodiments, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, thioketone, ester, heterocyclyl, —CN, aryl, aryloxy, perhaloalkoxy, aralkoxy, heteroaryl, heteroaryloxy, heteroarylalkyl, heteroaralkoxy, azido, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like. In some embodiments, the substituent is selected from cyano, halogen, hydroxyl, and nitro.

As used herein, an "analog", or "analogue" of a chemical compound is a compound that, by way of example, resembles another in structure but is not necessarily an isomer (e.g., 5-fluorouracil is an analog of thymine).

As used herein, a "derivative" of a compound refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include replacement of H by an alkyl, acyl, or amino group or a substituent described above. Derivatives can include compounds in which carboxyl groups in the parent compound have been derivatized to form salts, methyl and ethyl esters or other types of esters or hydrazides. Derivatives can include compounds in which hydroxyl groups in the parent compound have been derivatized to form O-acyl or O-alkyl derivatives. Derivatives can include compounds in which a hydrogen bond donating group in the parent compound is replaced with another hydrogen bond donating group such as OH, NH, or SH. Derivatives can include replacing a hydrogen bond acceptor group in the parent compound with another hydrogen bond acceptor group such as esters, ethers, ketones, carbonates, tertiary amines, imine, thiones, sulfones, tertiary amides, and sulfides.

Unless otherwise indicated, the term "polymer" includes both homopolymers and copolymers (e.g., polymers of two or more different monomers) and oligomers. Similarly, unless otherwise indicated, the use of a term designating a polymer class is intended to include homopolymers, copolymers and graft copolymers.

The term "molecular weight", as used herein, generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

The term "small molecule", as used herein, generally refers to an organic molecule that is less than 2000 g/mol in molecular weight, less than 1500 g/mol, less than 1000 g/mol, less than 800 g/mol, or less than 500 g/mol. Small molecules are non-polymeric and/or non-oligomeric.

The term "hydrophilic", as used herein, refers to substances that have strongly polar groups that readily interact with water. Hydrophilic polymers can include acrylic acid homo- and co-polymers such as acrylamide, and maleic anhydride polymers and copolymers; amine-functional polymers such as allylamine, ethyleneimine, oxazoline, and other polymers containing amine groups in their main- or side-chains. The term hydrophilic, when used to refer to a polymer or oligomer, can mean a polymer or oligomer having a relative energy difference ($RED=R_a/R_0$, where $R_a$=Polymer/Solvent HSP Distance, $R_0$=Polymer Solubility Sphere Radius) of equal or less than 1 with respect to water in Hansen solubility space at 25° C.

The term "hydrophobic", as used herein, refers to substances that lack an affinity for water; tending to repel and not absorb water as well as to not readily dissolve in or mix with water. The term hydrophobic, when used to refer to a polymer or oligomer, can mean a polymer or oligomer having a relative energy difference ($RED=R_a/R_0$, where $R_a$=Polymer/Solvent HSP Distance, $R_0$=Polymer Solubility Sphere Radius) greater than 1 with respect to water in Hansen solubility space at 25° C.

The term "amphiphilic", as used herein, refers to a molecule combining hydrophilic and lipophilic (hydrophobic) properties. "Amphiphilic material" as used herein refers to a material containing a hydrophobic or more hydrophobic oligomer or polymer (e.g., biodegradable oligomer or polymer) and a hydrophilic or more hydrophilic oligomer or polymer. The term amphiphilic can refer to a polymer or oligomer having one or more hydrophobic oligomer segments and one or more hydrophilic oligomer segments as those terms are defined above.

Curable Compositions

A variety of curable compositions are provided that overcome some of the aforementioned deficiencies, in particular curable compositions are provided for forming a coated surface with a fluorinated lubricant. The compositions are capable of providing highly lubricious surfaces that are more robust that common silicone-containing coatings, e.g. in high hydrocarbon environments. The lubricious surfaces can be self-replenishing, providing for long-lasting lubrications. In particular, if the curable compositions are a homogeneous mixture, then the cured compositions can also be optically clear and transparent, providing clear benefits for optical applications.

In some aspects, a curable mixture is providing containing (i) an end-group modified perfluoropolyether (PFPE), (ii) a fluorinated lubricant, and (iii) a compatibilizer. The mixture can also include a co-monomer in some aspects. The mixture is curable to form a solid having an exposed surface. At least a portion of the fluorinated lubricant can spontaneously form a lubricious surface on the exposed surface that is slippery, repellent, anti-fouling, easy-to-clean, and/or low friction. For example, through chemically and physically matching the lubricant and the base resin, and using an optimal amount of compatibilizer to balance the miscibility and surface properties, the cured compositions can be made with optical clarity and with a lubricious exposed surface. In some aspects, the compatibilizer is present in an amount sufficient to make the curable mixture miscible and to make the solid optically transparent while still spontaneously forming the lubricious surface that is slippery, repellent, anti-fouling, easy-to-clean, and/or low friction. In some aspects, the lubricious surface is capable of self-replenishing, e.g. a portion of the fluorinated lubricant can remain impregnated in and/or swelling the cured resin such that, when the lubricious overlay is degraded or removed, the lubricant blooms or partitions to the exposed surface in a useful timeframe to replenish the lubricious overlayer.

The base resin compositions include an end-group modified perfluoropolyether (PFPE). A variety of PFPEs can be used in the present compositions. In some aspects, the PFPE has a formula of A-F-B where F is either a linear or a branched perfluoropolyether, and A and B are each independently selected from the group consisting of an alcohol, a neutral or ionic form of carboxylic acid, a neutral or ionic form of phosphoric acid or its ester, a neutral or ionic form of phosphonic acid or its ester, a primary amine, a second or tertiary amine, an epoxy, an isocyanate, an acrylate, a methacrylate, a silane, a thiol, an alkene (vinyl, allyl), an alkyne, an alkoxy, an ionic urethane, a sulfonic acid or its ester, and a nitrile group.

In some aspects, a mixture of two or more different PFPE polymers can be used as well. In some aspects, the compositions include a first end-group modified perfluoropolyether and a second end-group modified perfluoropolyether different from the first end-group modified perfluoropolyether.

Both the first end-group modified perfluoropolyether and the second end-group modified perfluoropolyether can have a structure according to the formula A-F-B described above. In some aspects, a weight ratio of the first end-group modified perfluoropolyether to the second end-group modified perfluoropolyether is about 5:1 to about 4:1, about 4:1 to about 3:1, about 3:1 to about 2:1, about 2:1 to about 1:1, about 1:1 to about 1:2, about 1:2 to about 1:3, about 1:3 to about 1:4, about 1:4 to about 1:5, or some combination of these ranges.

The end-group modified PFPE polymers can in principle have any molecular weight so long as the composition cures to form a resin having the requisite physical and chemical properties. In some aspects, the end-group modified PFPE polymers have an average molecular weight of about 1000 g/mol to about 20000 g/mol, about 1000 g/mol to about 12000 g/mol, about 1000 g/mol to about 3000 g/mol, about 3000 g/mol to about 5000 g/mol, about 5000 g/mol to about 9000 g/mol, or about 9000 g/mol to about 12000 g/mol, or any combination thereof. In some aspects, when there are two or more different PFPE polymers the end-group modified perfluoropolyether can have an average molecular weight that is different from the average molecular weight of the second end-group modified perfluoropolyether.

The compositions include a compatibilizer. The compatibilizer can provide for improved miscibility of the composition and/or optical clarity of the cured composition. In some aspects, the amount of compatibilizer is adjusted to provide for miscibility and/or optical clarity without sufficiently negatively impacting the lubricious properties of the cured composition. In some aspects, the compatibilizer is added in an amount (wt %) that is roughly equal to a minimum loading sufficient to obtain miscibility and/or optical clarity, e.g. the compatibilizer is added in an amount (wt %) that is within about 35%, about 30%, about 25%, about 20%, about 15%, about 10%, about 8%, or about 5% of the minimum loading amount (wt %). The minimum loading can depend on several factors, including the precise chemical nature of the base resin, the compatibilizer, and the lubricant, and the amount of lubricant present. The minimum loading can be experimentally determined for a given formulation by incrementally adjusting the amount of compatibilizer to achieve the miscibility of the formulation and/or optical clarity of the cured composition. This can be readily appreciated from the examples below. In some aspects, the compatibilizer is present in an amount from about 1% to about 10%, about 2% to about 10%, or about 2% to about 8% by weight based upon the weight of the mixture.

Curable compositions can include a variety of compatibilizers to facilitate the formulation of a homogeneous mixture without phase separation in ambient conditions. In some aspects, the compatibilizer is a mono-functional perfluoropolyether, a carboxylic acid-modified perfluoropolyether, a di-functional perfluoropolyether, a dihydroxyl-modified perfluoropolyether, a hydrofluoroether (HFE), Suprion, Vertrel XF, a perfluoroalkyl alkyl ether, or a mixture thereof.

The compositions can include a co-monomer. In some aspects, the co-monomer can modulate the bulk properties of the cured resin. In some aspects, the co-monomer has a structure according to the formula $(Rf)_n$—R—X where Rf is a perfluoroalkyl, n is an integer from 1 to 3, R is a non-fluorinated or partially fluorinated hydrocarbon, and X is a polymerizable end group. In some aspects, the perfluoroalkyl can have a number of carbon atoms from a minimum of about 1, 2, 3, or 4 to a maximum of about 20, 18, 15, or 12. In some aspects, R is a non-fluorinated or partially fluorinated hydrocarbon having a number of carbon atoms from a minimum of about 1 or 2 to a maximum of about 10, 8, or 6. In some aspects, two or more different co-monomers are included in the formulations. For example, two or more different co-monomers can be included having a structure according to the formula $(Rf)_n$—R—X described above.

Curable compositions can include a variety of fluorinated lubricants. The ability to create optically clear cured compositions with fluorinated lubricants provides several advantages, for example in harsh environments and for optical applications. In some aspects, the fluorinated lubricant is a perfluoropolyether, a partially hydrogenated perfluorocarbon, perfluorobron, perfluorodecalin, perfluoromethyldecalin, perfluoroperhydrophenanthrene, a perfluoroalkyl copolymer, a fluoroacrylic copolymer, a fluorosilicone, a cyclic fluorocarbon, a perfluoroalkyl amine, a fluorocarbon with one or more other halogen atoms, or a mixture thereof.

The fluorinated lubricant can be added with high lubricant loading, although this is not necessarily the case in all instances. In some aspects, it has been found that lubricant loading of 50% or more can be achieved to provide for long-term lubrication and replenishment of the lubricious surface. In some aspects, the fluorinated lubricant is present in an amount from a minimum of about 2%, 5%, 10%, 20%, 30%, or 40% by weight to a maximum of about 60%, about 50%, about 40%, about 30%, or about 25% by weight.

In some aspects, the curable mixture is packaged in the form of a spray, paint, dispenser cartridge, or an injection syringe. In some aspects, the curable mixture is capable of being cured by the application of light, e.g. a UV light source. In some aspects, at least one of the components is non-reactive and does not form a covalent bond with other components.

Articles

The curable mixtures can be used to prepare a variety of articles and coated surfaces. The articles can be two-dimensional or three-dimensional articles. The articles can be made to have high optical transparency and/or long-term repellent, anti-stick, and lubricious properties. In some aspects, the articles may have some phase separation at the micro-scale that leads to slight translucence or opacity.

In some aspects, the article is a two-dimensional film, sheer, tape, or coating. The articles can be made such that the article has a first side comprising a lubricious layer and a second side, having dissimilar properties from the first side. For example, the second side can have surface modifiers and/or adhesive layers applied thereto to aid in adhering the article. The article can have a release liner or a sacrificial film on either or both of the sides.

In some aspects, a surface of the article presents dry to touch upon full curing. In some aspects, a surface of the article presents a wet surface upon full curing. In some aspects, the article has a texture or a roughness on the surface. In some aspects, the surface and/or the articles is optically transparent. In some aspects, the surface and/or the article is phase-separated in microscopic scale and is translucent or opaque.

In some aspects, three-dimensional articles are also provided including the cured compositions described herein. The articles can include a tubing, a container, a vessel, a tank, or a vat. In some aspects, the curable composition is applied to the inside of the tubing, container, vessel, tank, or vat and cured in-place on the surface, e.g. through the application of light having a suitable intensity and wavelength to cure the composition.

In some aspects, the compositions can be applied directly to a substrate and cured in-place on the substrate. In some aspects, the cured article is applied to the substrate is a completely- or a partially-cured state. The article can be adhered to the substrate using a primer or an adhesion promoter that is applied to the substrate. The primer or adhesion promotor can be, for example, a fluorohydrocarbon with carboxylic acid (Cytop A and Fluorolink C), anionic polyurethane-modified perfluoropolyether (Fluorolink P56), alkoxysilane-modified perfluoropolyether (Fluorolink S10), trialkoxysilane-acrylic-modified perfluoropolyether (Fluorolink MD407), trialkoxysilane-acrylic-modified hydrocarbons.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Materials

Fomblin® MD40 is a bifunctional PFPE-urethane methacrylate available from Solvay SA. It has a viscosity of about 695 cP and molecular weight of about 4000 g/mol. Krytox GPL 100, KRYTOX GPL 101, KRYTOX GPL 102, and KRYTOX GPL 103 are all perlfuoropolyether lubricants available from DuPont (now from Chemours), USA. Krytox 157 FSL and Krytox 157 FSH are functionalized versions of the Krytox fluorinated lubricants available from DuPont, USA. The functionality is a carboxylic acid group located on the terminal fluoromethylene group of poly(hexafluoropropylene oxide). 157 FSL is a lower molecular weight version having a viscosity of about 99.4 to about 149 cSt at 40° C. and a molecular weight of about 2500 or less. 157 FSH is a high molecular weight version having a viscosity of about 703 to about 1055 cSt and a molecular weight of about 7000 to about 7500. Fluorolink D4000 is a diol end-group functionalized perfluoropolyether polymer available from Solvay Specialty Polymers. DMS S21 is a silanol terminated polydimethylsiloxane having a molecular weight of about 4200 g/mol available from Gelest. Gransil DM 100 is a medium viscosity dimethyl polysiloxane available from Grant Industry. Test fouling fluids included laundry detergent, dark cutting oil, body lotion, red wine vinegar, and red wine.

Example 1: MD40:Krytox 100 Based Systems Having a Compatibilizer

Methods

For a broader repellency against a wide range of fouling test liquids, it is important to screen different types of lubricant chemistry. The miscibility tests were performed by visibly observing (taking a picture) (i) immediately after combining the test fluid and lubricant, (ii) following vortex mixing for 10 seconds, and (ii) after waiting at least 4 hours. Results were characterized based on (i) the lubricant fully separates from the test liquid after vortex mixing, (ii) there is some but incomplete (less than for Krytox 103) separation between the lubricant and test liquid, (iii) the lubricant is miscible with the test liquid.

Results

The miscibility test results are depicted in Table 1 for mixtures of the lubricant (Krytox 103, DM 100, or DMS S21) with various test liquids at least 4 hours following vortex.

TABLE 1

Miscibility test results for mixing the test liquid with lubricants Krytox 103, DM 100, or DMS S21.

| Test Liquid | Krytox 103 | DM 100 | DMS S21 |
|---|---|---|---|
| Cutting Oil | ✓ | X | X |
| Lotion | ✓ | ✓ | ✓ |
| Red Wine | ✓ | — | X |
| Wed Wine Vinegar | ✓ | — | X |
| Laundry Detergent | ✓ | — | X |

A check (✓) indicates the lubricant separated fully from the test liquid after vortex, X indicates the lubricant and test liquid were miscible after vortex, and a dash (—) indicates there is incomplete/partial separation of the lubricant from the test liquid after vortex.

The results above indicate that a PFPE lubricant (Krytox 103) shows a wide range of repellency compared to silicone-based lubricants (DM100, DMS S21) tested. Therefore it is clearly advantageous to have a curable composition that can use a PFPE as a lubricant.

Example 2: MD40 as a Binder Containing Krytox 100 as a Lubricant and a Compatibilizer Methods MD40 and Krytox 100 at a 1:1 ratio is cloudy due to poor compatibility. To enhance the miscibility and hence to eliminate cloudiness, 3 different compatibilizers were tested (Krytox FSL, Krotox FSH, Fluorolink D4000). These compatibilizers were added by 0.5% until the mixtures were no longer cloudy (referred to as the minimum loading). The compatibilizers were also added at 10% loading. These formulations were then tested for performance by drop casting followed by UV curing (Darocur 1173 photoinitiator, UV cure with a 50 mW/cm² UV lamp with varying exposure times from 10 sec to 3 min under nitrogen atmosphere) them and then measuring the time it took one 10 µl droplet of test liquid (Dark Cutting Oil, Water, Vegetable Oil, Hexadecane) to slide a fixed distance of 4 cm for MD40 data and NoWipe 10% FSL data and from the top of the slide to the bottom (7.62 cm) for all other data points. Measurements were taken right after curing (no wipe), after samples were wiped dry to remove the lubricious overlayer, LOL (Wipe), and after the samples were left to rebloom overnight (Rebloom).

Results

Figure 1B:
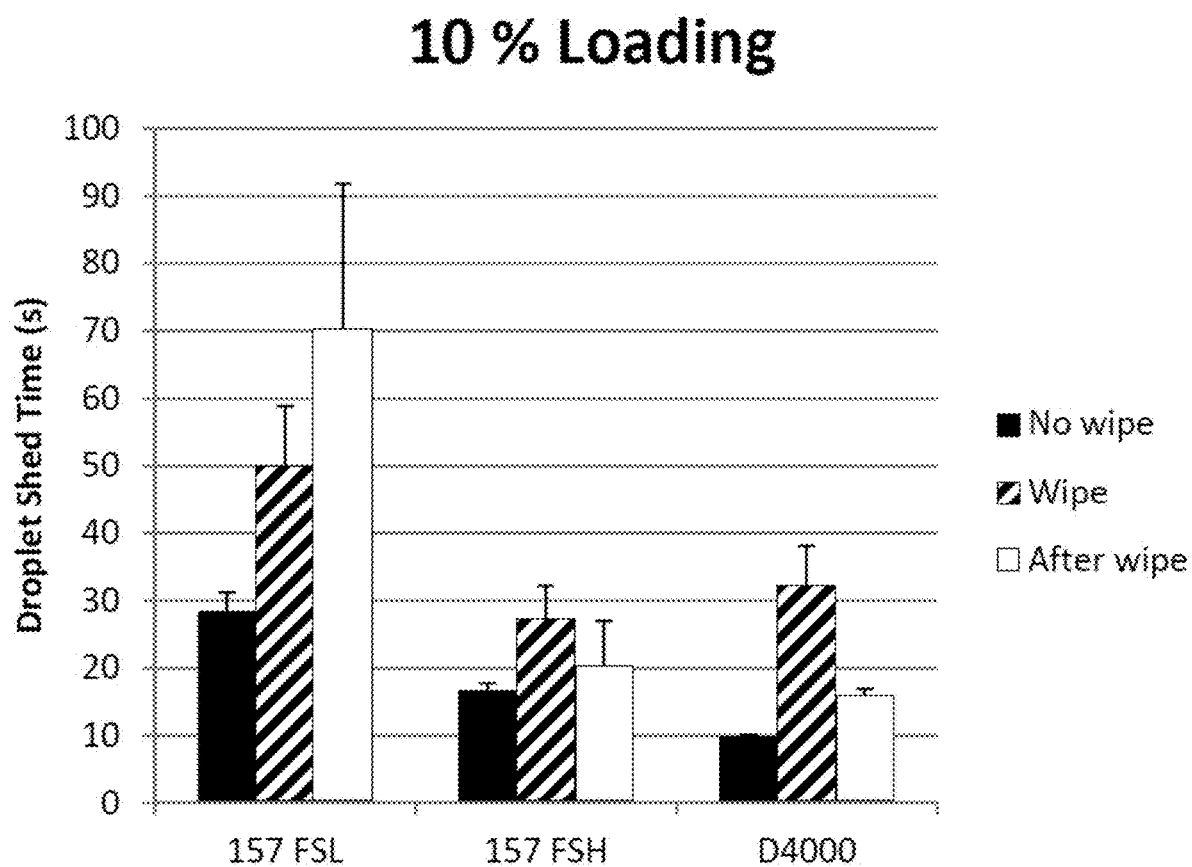
FIG. 1B is a bar graph of the droplet shed time (seconds) for dark cutting oil for an MD40:Krytox 100 (1:1) cured resin with 10% (wt/wt) loading of 157 FSL, 157, or D4000 shortly after curing (no wipe), following wiping the surface to remove the liquid overlayer (wipe), and after allowing the surface to rebloom following wiping (after wipe). Unless otherwise indicated all data was collected in triplicate. Unless otherwise indicated all data was collected in triplicate. Unless otherwise indicated all data was collected in triplicate. If there is no data point, this indicates droplet pinning.

The minimum loading of compatibilizer was determined to be about 3.581% (w/w) for FSL, about 4.657% (w/w) for FSH, and about 8.532% (w/w) for D4000. The results of the droplet shedding time for Dark Cutting Oil are depicted in FIGS. 1A-1B.

Figure 2:
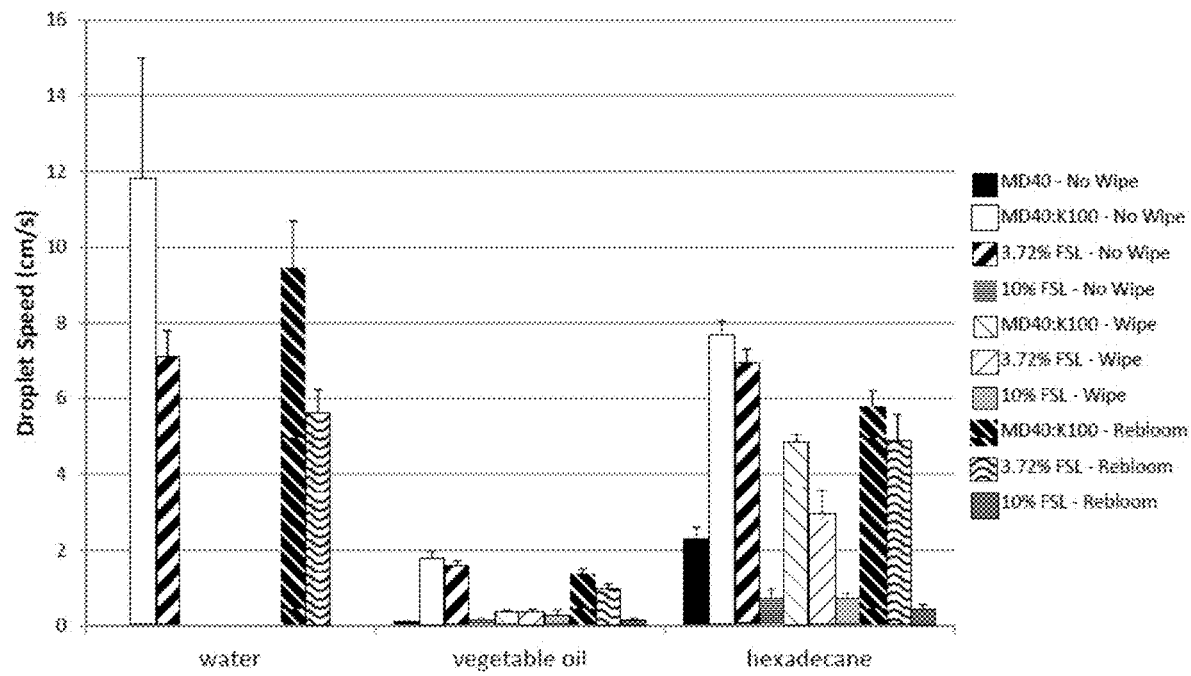
FIG. 2 is a bar graph of the droplet speed (centimeters per second) for a water, vegetable oil, or hexadecane test liquid on an MD40:Krytox 100 (1:1) cured resin with either a minimal loading or a 10% (wt/wt) loading of 157 FSL, 157, or D4000 shortly after curing (no wipe), following wiping the surface to remove the liquid overlayer (wipe), and after allowing the surface to rebloom following wiping (rebloom). Unless otherwise indicated all data was collected in triplicate. Unless otherwise indicated all data was collected in triplicate. If there is no data point, this indicates droplet pinning.

The droplet speed test results for water, vegetable oil, and hexadecane are depicted in FIG. 2.

Figure 3:
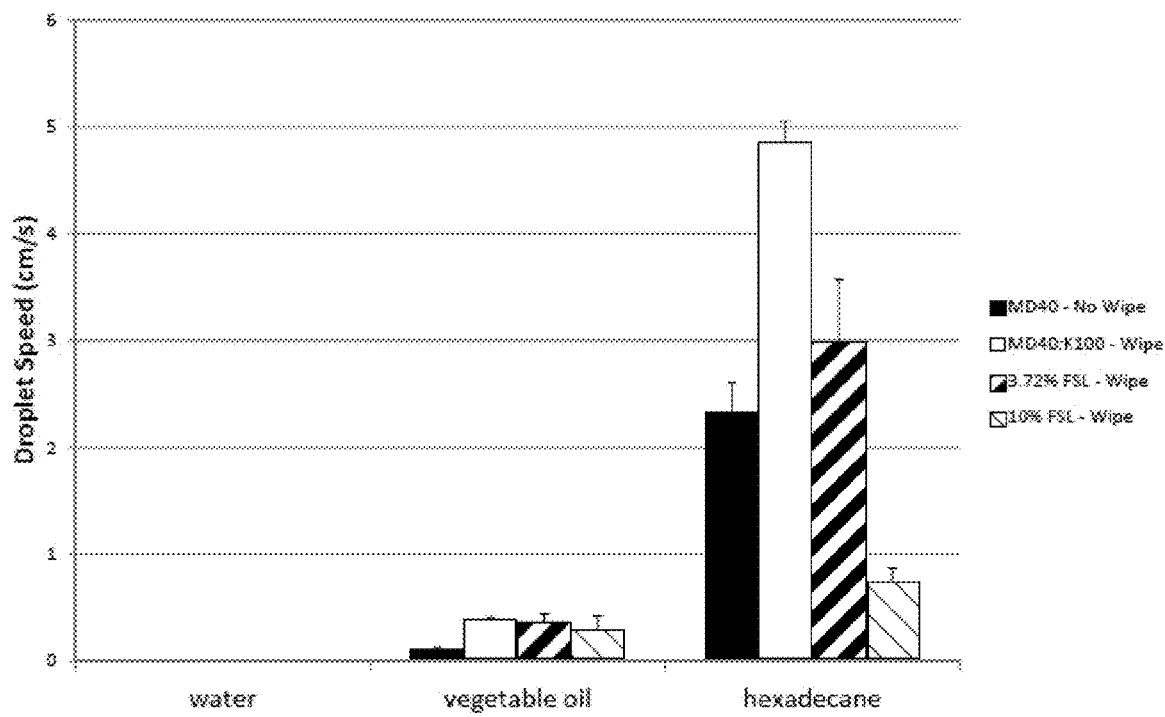
FIG. 3 is a bar graph of the droplet speed (centimeters per second) for a water, vegetable oil, or hexadecane test liquid on an MD40 cured resin and on an MD40:Krytox 100 (1:1) cured resin with either no compatibilizers, with a minimal loading (3.72 wt %) of 157 FSL, or with a 10 wt % loading of 157 FSL. Unless otherwise indicated all data was collected in triplicate. Unless otherwise indicated all data was collected in triplicate. If there is no data point, this indicates droplet pinning.
Figure 4:
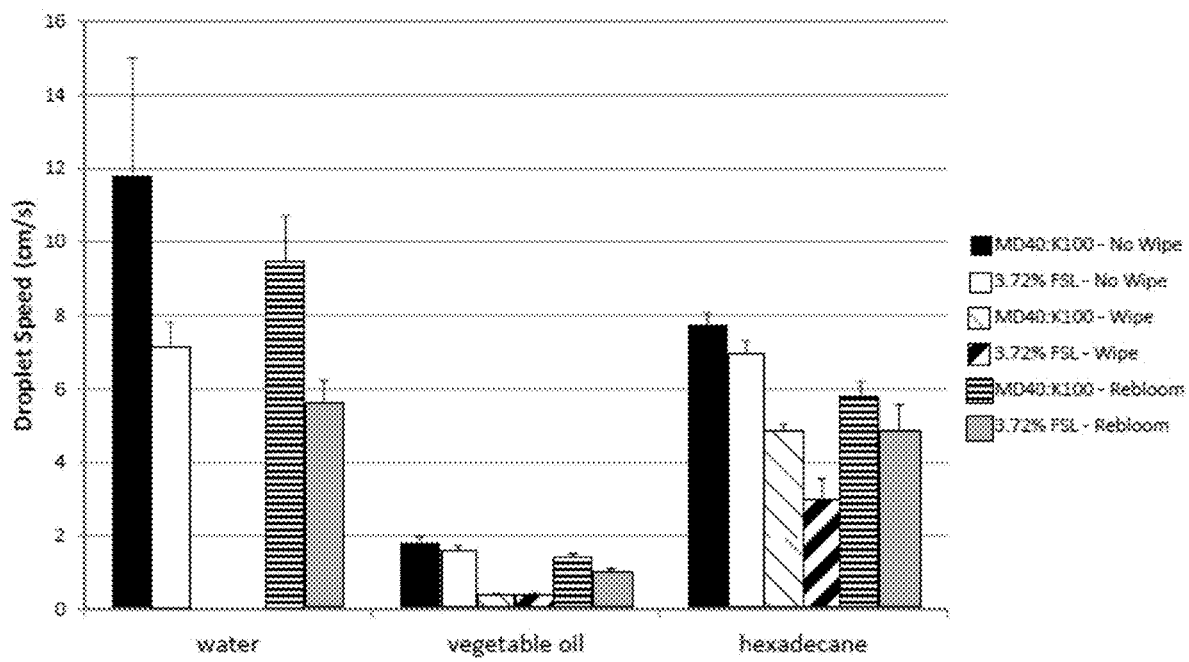
FIG. 4 is a bar graph of the droplet speed (centimeters per second) for a water, vegetable oil, or hexadecane test liquid on an MD40:Krytox 100 (1:1) cured resin with and without 157 FSL compatibilizer (3.72 wt %). Unless otherwise indicated all data was collected in triplicate. If there is no data point, this indicates droplet pinning.
Figure 5:
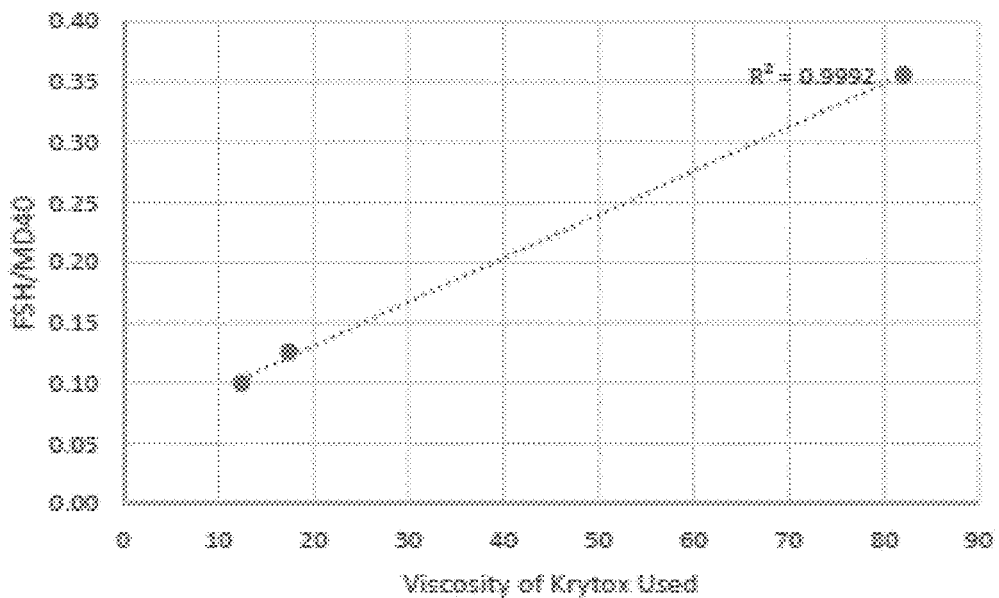
FIG. 5 is a graph of the ratio of amount of 157 FSH compatibilizer to MD40 (wt/wt) as a function of the lubricant viscosity (Krytox 100, Krytox 101, and Krytox 103) for an MD40:Krytox cured composition with 1:1 (wt:wt) of MD40 to Krytox.
Figure 6:
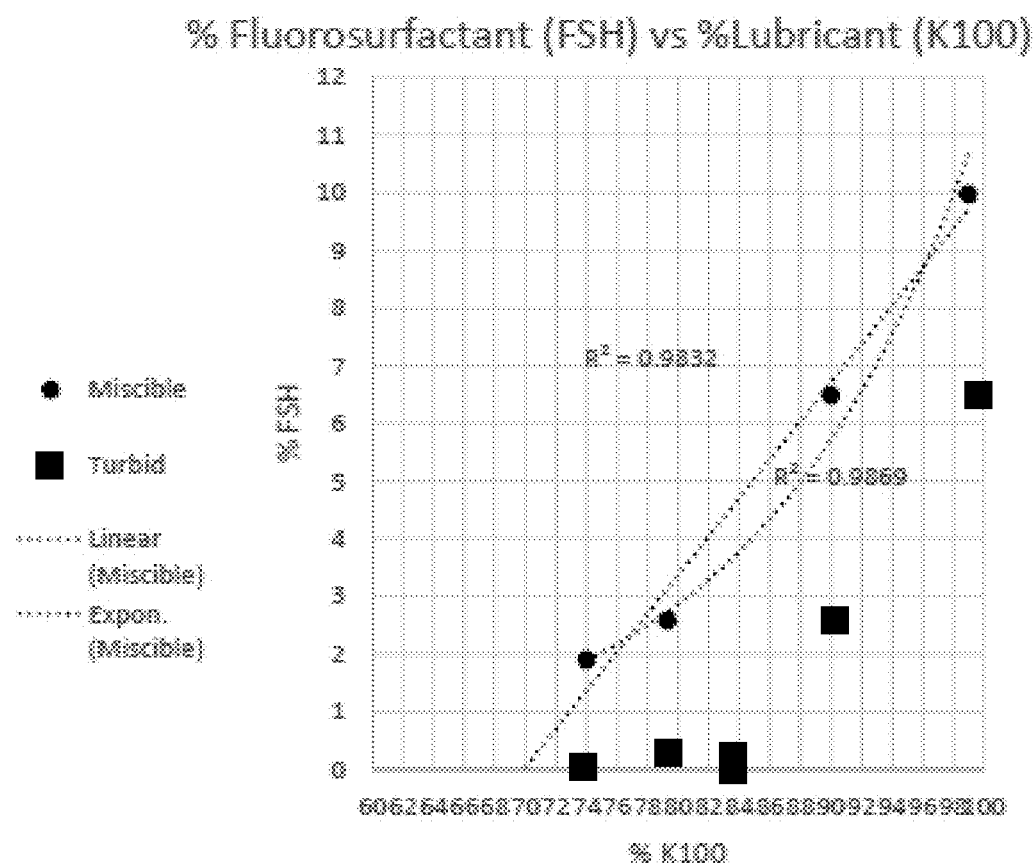
FIG. 6 is a graph of the minimum loading amount for 157 FSH (wt % FSH) to create miscible compositions or to create turbid compositions as a function of the amount of Krytox 100 lubricant (wt % of K100).

The droplet speed test results for FSL depicted in FIG. 3 demonstrate how the addition of 157 FSL changes the surface properties of cured samples. The droplet speed test results in FIG. 4 demonstrate how the addition of a minimum loading of 157 FSL decreased droplet speed in all examples measured. Higher loadings of 157 FSL were observed to prevent formation of a lubricious overlayer in many cases and, in cases where a liquid overlayer is formed, the presence of 157 FSL is observed to decreased the droplet speed (decrease performance) in all cases. FIG. 5 depicts the required fluorosurfactant concentration as a function of the lubricant viscosity for Krytox lubricants showing that, as the viscosity increases so does the required fluorsurfactant concentration. FIG. 6 depicts the solubility trend as a function of the fluorosurfactant (FSH) and the amount of lubricant (K100). Since excessive FSH reduced droplet speed, the amount must be optimized to balance the miscibility with the performance/droplet speed results. This trend is attributed to the presence of increased concentration of carboxylic acid groups (can form weak interactions with test liquids via weak interactions such as hydrogen bonding, polar, ionic interactions) on the surface by the addition of FSL and FSH, although both fluorosurfacts can help compatibilizing the mixture to form a uniform cured coating, an essential requirement to be practically useful as a coating.

Example 3: MD40 with Fluorinated Acrylate Co-Monomer as a Binder Containing Krytox as a Lubricant and a Compatibilizer MD40 (RI=1.313 m 58% wt/wt F content) was used as the base resin with three different fluorinated acrylate as co-monomers: perfluorohexylethyl acrylate (PFHEA), perfluorobutylethyl acrylate (PFBEA), and hexafluoroisopropyl acrylate (PFIPA). Initially, the mixtures were tested without adding Krytox as a lubricant for compatibility check. The mixtures were drop cast and UV cured (Darocur 1173 photoinitiator, UV cure with a 50 mW/cm2 UV lamp with varying exposure times from 10 sec to 3 min under nitrogen atmosphere) to form a film. The structures of MD40, PFHEA, PFBEA, and PFIPA are depicted in the formulas below.

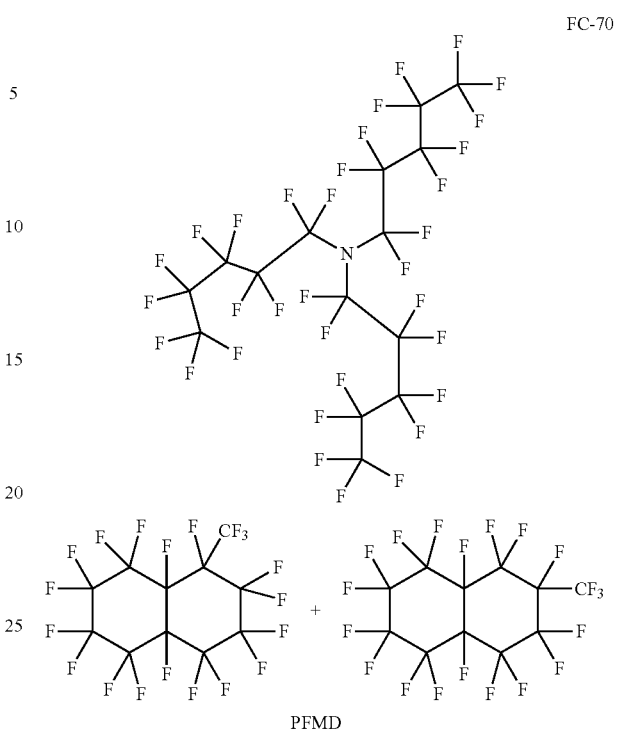

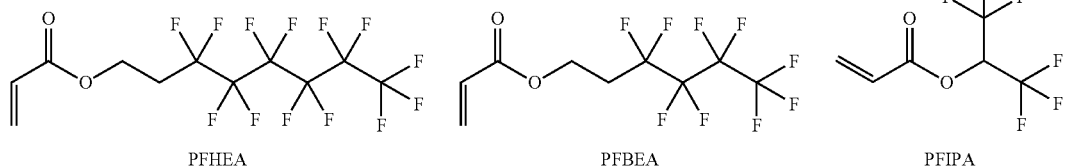

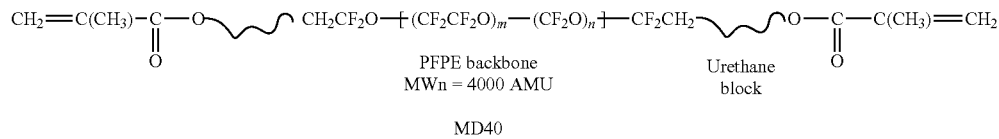

Initial results indicated that a 1:1 MD40:PFHEA formulation wrinkles upon curing. This is due to the incompatibility between a perfluoroalkyl chain and a perfluoroether chain. Formulations were thus prepared with less PFHEA (14% and 17%). The base resin compositions can be prepared with MD40 and the fluorinated acrylate monomers with a ratio of MD40 to monomer of about 1:1 to about 5:1.

Lubricants such as the Krytox lubricants from Example 2 can be used as well as both branched (Fomblin Y) and linear (Fomblin Z) grades of PFPE lubricants.

Compatibilizers such as D-4000, PFMD, HFE or Suprion (hydrofluoroether, 3M Novec), or FC70 can be added to control the phase separation.

The formulations can be applied to a variety of substrates. In some examples, the formulations were applied to optical substrates such as sapphire, quartz, glass, or polycarbonate. These substrates have surface —OH groups which can be functionalized to promote adhesion. Adhesion promoters can include carboxylic acids (Cytop A and Fluorolink C), anionic polyurethane (PU) (Fluorolink P56), alkoxysilanes (Fluorolink S10), trialkoxysilane/acrylics (Fluorolink MD407), or trimethoxysilylpropyl methacrylate.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A curable mixture comprising:
   (i) an end-group modified perfluoropolyether (PFPE),
   (ii) a fluorinated lubricant;
   (iii) a compatibilizer, and
   (iv) a co-monomer;
   wherein the mixture is curable to form a solid comprising an exposed surface;
   wherein at least a portion of the fluorinated lubricant spontaneously forms a lubricious surface on the exposed surface; and
   wherein the compatibilizer is present in an amount sufficient to make the curable mixture miscible and to make the solid optically transparent while still spontaneously forming the lubricious surface that is slippery, repellent, anti-fouling, easy-to-clean, and/or low friction.

2. The curable mixture according to claim 1, in which the end-group modified perfluoropolyether has a formula of A-F-B where F is either a linear or a branched perfluoropolyether, and A and B are each independently selected from the group consisting of an alcohol, a neutral or ionic form of carboxylic acid, a neutral or ionic form of phosphoric acid or its ester, a neutral or ionic form of phosphonic acid or its ester, a primary amine, a second or tertiary amine, an epoxy, an isocyanate, an acrylate, a methacrylate, a silane, a thiol, an alkene (vinyl, allyl), an alkyne, an alkoxy, an ionic urethane, a sulfonic acid or its ester, and a nitrile group.

3. The curable mixture according to claim 1, comprising a first end-group modified perfluoropolyether and a second end-group modified perfluoropolyether different from the first end-group modified perfluoropolyether.

4. The curable mixture according to claim 3, wherein one or both of the first end-group modified perfluoropolyether and the second end-group modified perfluoropolyether have a formula of A-F-B where F is either a linear or a branched perfluoropolyether, and A and B are each independently selected from the group consisting of an alcohol, a neutral or ionic form of carboxylic acid, a neutral or ionic form of phosphoric acid or its ester, a neutral or ionic form of phosphonic acid or its ester, a primary amine, a second or tertiary amine, an epoxy, an isocyanate, an acrylate, a methacrylate, a silane, a thiol, an alkene (vinyl, allyl), an alkyne, an alkoxy, an ionic urethane, a sulfonic acid or its ester, and a nitrile group.

5. The curable mixture according to claim 1, in which the co-monomer has the structure according to the formula $(Rf)_n$—R—X where Rf is a perfluoroalkyl, n is an integer from 1 to 3, R is a non-fluorinated or partially fluorinated hydrocarbon, and X is a polymerizable end group.

6. The curable mixture according to claim 5, in which the perfluoroalkyl has a number of carbons from 1 to 12.

7. The curable mixture according to claim 6, in which the R is a non-fluorinated or partially fluorinated hydrocarbon having about 1 to 6 carbon atoms.

8. The curable mixture according to claim 1, in which the fluorinated lubricant comprises a perfluoropolyether, a partially hydrogenated perfluorocarbon, perfluorobron, perfluorodecalin, perfluoromethyldecalin, perfluoroperhydrophenanthrene, a perfluoroalkyl amine, a fluorocarbon with one or more other halogen atoms, or a mixture thereof.

9. The curable mixture according to claim 1, wherein the compatibilizer is present in an amount from about 2% to about 10% based upon a total weight of the mixture.

10. The curable composition according to claim 1, wherein the compatibilizer is selected from the group consisting of a mono-functional perfluoropolyether, a carboxylic acid-modified perfluoropolyether, a di-functional perfluoropolyether, a dihydroxyl-modified perfluoropolyether, a hydrofluoroether (HFE), a perfluoroalkyl alkyl ether, 2,3-dihydrodecafluoropentane, and a mixture thereof.

11. The curable mixture according to claim 1, wherein the concentration of the fluorinated lubricant is about 30% to about 60% by weight based upon a total weight of the curable mixture.

12. An article having a lubricious surface, the article comprising a curable mixture according to claim 1 that has been cured to form the lubricious surface.

13. The article according to claim 12, wherein the article is a film, a sheet, a tape, or a coating.

14. The article according to claim 12, wherein the article has a first side comprising a lubricous layer and a second side, having dissimilar properties from the first side.

15. The article according to claim 12, wherein the article has a first side comprising a lubricous layer and a second side comprising a release liner or a sacrificial film.

16. The article according to claim 12, wherein the article is a tubing, a container, a vessel, a tank, or a vat.

17. The article according to claim 12, wherein the surface is optically transparent.

18. The article according to claim 12, wherein the cured solid is adhered to another substrate using a primer or an adhesion promoter.

19. The article according to claim 18, wherein the primer or adhesion promoter is selected from the group consisting of a fluorohydrocarbon with carboxylic acid (Cytop A and Fluorolink C), anionic polyurethane-modified perfluoropolyether (Fluorolink P56), alkoxysilane-modified perfluoropolyether (Fluorolink S10), trialkoxysilane-acrylic-modified perfluoropolyether (Fluorolink MD407), and trialkoxysilane-acrylic-modified hydrocarbons.

* * * * *